(12) United States Patent
Kelley et al.

(10) Patent No.: US 12,259,717 B2
(45) Date of Patent: Mar. 25, 2025

(54) INDUSTRIAL CONTROL SYSTEM DEVICE CLASSIFICATION

(71) Applicant: Lawrence Livermore National Security, LLC, Livermore, CA (US)

(72) Inventors: Brian Michael Kelley, Livermore, CA (US); Indrasis Chakraborty, Lafayette, CA (US); Brian James Gallagher, Livermore, CA (US); Daniel Matthew Merl, Livermore, CA (US)

(73) Assignee: LAWRENCE LIVERMORE NATIONAL SECURITY, LLC, Livermore, CA (US)

( * ) Notice: Subject to any disclaimer, the term of this patent is extended or adjusted under 35 U.S.C. 154(b) by 440 days.

(21) Appl. No.: 17/860,852

(22) Filed: Jul. 8, 2022

(65) Prior Publication Data

US 2023/0028553 A1 Jan. 26, 2023

Related U.S. Application Data

(60) Provisional application No. 63/219,591, filed on Jul. 8, 2021.

(51) Int. Cl.
*G05B 19/418* (2006.01)
*G06N 3/045* (2023.01)

(52) U.S. Cl.
CPC ......... *G05B 19/4185* (2013.01); *G06N 3/045* (2023.01)

(58) Field of Classification Search
CPC ...... G05B 19/4185; G06N 3/045; G06N 3/09; G06N 20/10; G06N 20/20; G06N 3/0475; Y04S 40/20

See application file for complete search history.

(56) References Cited

U.S. PATENT DOCUMENTS

2022/0269258 A1* 8/2022 Yang .................. G05B 23/0281

OTHER PUBLICATIONS

Paper "IP2Vec: Learning Similarities between IP Addresses", by Markus Ring, etc., published in 2017, [online], retrieved from <https://ieeexplore.ieee.org/stamp/stamp.jsp?arnumber=8215725> (Year: 2017).*
Cavazzuti, M., "Optimization Methods: From Theory to Design," Springer-Verlag Berlin Heidelberg, 2013, chap. 2, pp. 13-56.
Chakraborty, I., et al., "Industrial control system device classification using network traffic features and neural network embeddings," Array, vol. 12, Dec. 2021, 100081.
Goodfellow, J., I., et al., "Generative Adversarial Nets," Advances in Neural Information Processing Systems, pp. 2672-2680, 2014.

* cited by examiner

*Primary Examiner* — Charles Cai
(74) *Attorney, Agent, or Firm* — Perkins Coie LLP (57) ABSTRACT

In an industrial control system (ICS), latent vectors are generated to represent identity or behaviors of host devices coupled to the ICS. A computing system captures communications transmitted by a host device across a network associated with the ICS. A set of values are extracted from one or more respective fields in the communication, then applied to a trained neural network. Values of a first set of fields are applied at an input layer of the trained neural network, while values of a second set of fields are applied at an output layer of the neural network. Based on the application of the neural network to the values extracted from the communication, the computing system generates a latent vector.

20 Claims, 10 Drawing Sheets

INDUSTRIAL CONTROL SYSTEM DEVICE CLASSIFICATION

CROSS-REFERENCE TO RELATED APPLICATION

This application claims the benefit of U.S. Provisional Patent Application No. 63/219,591, filed Jul. 8, 2021, which is incorporated herein by reference in its entirety.

STATEMENT REGARDING FEDERALLY SPONSORED RESEARCH

This invention was made with Government support under Contract No. DE-AC52-07NA27344 awarded by the United States Department of Energy. The Government has certain rights in the invention.

BACKGROUND

Industrial Control Systems (ICSs) are a general class of structures that carry out the automation of industrial processes. ICSs are used to control a wide range of manufacturing systems, fossil fuel delivery systems, communications systems, electricity distribution system, and so on. Some particularly complex and critical forms of ICSs are those that support an electrical grid. An electrical grid is a network of suppliers and consumers of energy. An electrical grid includes a transmission grid and a distribution grid. Suppliers of large amounts of energy (e.g., hydroelectric plants and nuclear plants) supply high voltage electrical power to the transmission grid for transmission to substations. The substations step the high voltage electrical power of the transmission grid to lower voltage electrical power of the distribution grid. Consumers connect to the distribution grid to obtain their electrical power. Various suppliers such as city power plants, solar farms, and wind farms may also connect to the distribution grid to supply electrical power.

An electrical grid includes a vast collection of physical devices that include various sensing and actuation mechanisms and general-purpose computing devices. The use of these physical devices has a goal of improving efficiency of the electrical grid. Unfortunately, the wide-spread use of these devices provides opportunities for misuse and abuse due to the vastness of the collection and complex networking needed to control and monitor the physical devices. One example of an abuse is the ransomware attack in 2021 of Colonial Pipeline which operates petroleum distribution pipelines. Although (as reported) the attack did not directly affect the ICS of pipeline, the pipelines were shut down to prevent the attackers from attacking the ICS.

To reduce the vulnerability of an ICS to an attack, an ICS operator strives to ensure the ICS devices and supervisory systems (e.g., servers) include up-to-date hardware and software. A difficulty, however, is that an ICS operator may not have good records of relating to ICS devices of the ICS. The ICS may control a vast industrial system (e.g., pipeline) in a region that spans multiple governmental entities (e.g., states) and may have thousands of ICS devices installed throughout the region. Over the course of many years (even decades), ICS devices by different manufacturers having different model numbers may have been installed and replaced. Also, the software that runs on the devices may have been updated (or not) over time. An ICS operator may not even know what ICS devices are currently part of the ICS let alone what software is installed on the ICS devices. For example, technicians in different states may have replaced ICS devices with ICS devices that have different model numbers or from different manufacturers and installed new software and not reported or incorrectly reported the changes to the ICS operator.

One approach to auditing a network to identify devices and installed software of the network is to actively scan the devices. Such as scan broadcasts requests for device and software information. The devices, if capable of doing so, respond with the requested information. Unfortunately, the active scan of ICS devices may not be allowed because of the impact on the performance of the network or for security reasons (e.g., an active scan may be part of an attack).

DETAILED DESCRIPTION

Methods and system are provided for generating latent vectors to represent devices of an industrial control system (ICS). A computing system passively captures communications transmitted by a host device across a network associated with the ICS. Communications within the ICS can be transmitted in accordance with an associated ICS or Internet protocol, which specifies a packet structure for the communication. A neural network is used to generate latent vectors based on these communications. The latent vectors, which are representations of features of the communication as a fixed-length vector, are usable by any of a variety of models or systems to derive information about identity or behaviors of the devices communicating on the ICS, interactions between the devices, or other information about the ICS.

In order to generate such latent vectors, a set of values are extracted from one or more respective fields in a communication and applied to a neural network. Values of a first set of fields are applied at an input layer of the trained neural network, while values of a second set of fields are applied at an output layer of the neural network. A latent vector is generated at a hidden layer of the neural network based on the application of the values to the input and output layers.

Figure 1:
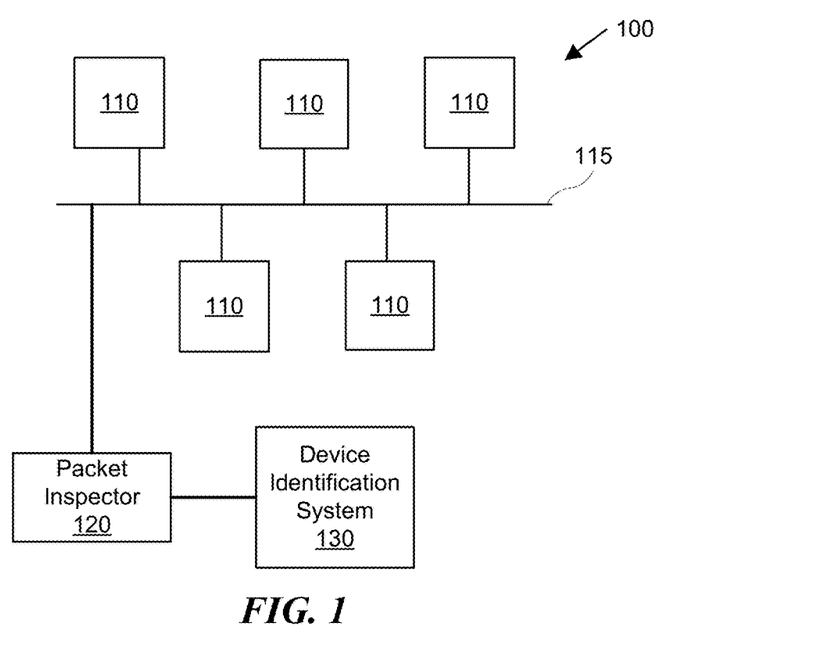
FIG. 1 illustrates an example industrial control system.

FIG. 1 illustrates an example industrial control system 100. As shown for example in FIG. 1, the ICS 100 includes multiple ICS host devices 110, a packet inspector 120, and a device identification system 130 coupled to a bus 115. The ICS 100 is a system used in the automation or monitoring of an industrial process and includes, for example, any of a variety of manufacturing systems, fossil fuel delivery systems, communication systems, electricity distribution systems, or water treatment or distribution systems.

The host devices 110 include any of a variety of devices within the ICS 100 that are capable of generating or receiving communications over a network, such as the bus 115. For example, the host devices 110 can include devices that are controlled to achieve an objective within the ICS (e.g., devices that regulate power distribution), devices to measure parameters of the ICS or the environment in which it operates, as well as devices that control other devices based on the measured parameters. The host devices 110 transmit and receive communications over the bus to perform actions related to control or operation of the ICS 100. For example, the host devices 110 transmit messages containing information about parameters measured by respective devices (e.g., temperature measurements or voltage measurements), messages containing information about status of devices in the ICS, or messages containing information about operations performed by devices in the ICS. Communications can be generated by the host devices 110 in accordance with an ICS communication protocol that specifies a packet structure for each packet of communication data that is transmitted across the bus 115. Some of the devices 110 may additionally use other communication protocols, such as the Transmission Control Protocol and Internet Protocol (TCP/IP).

The packet inspector 120 captures information about communications transmitted between the ICS devices. In some implementations, the packet inspector 120 passively monitors packets transmitted across one or more busses in the ICS, such as the bus 115, to avoid interrupting potentially critical communications within the system and to bypass restrictions on active scanning that may be imposed in some ICSs. For example, the packet inspector 120 can include a passive network tap that copies data packets or portions of data packets for out-of-band analysis.

The device identification system 130 determines information about identity of the host devices or their behaviors within the ICS based on the communication data captured by the packet inspector 120. The device identification system 130 applies a trained neural network to data extracted from the communication data to generate a latent vector. The latent vector is a representation of characteristics of host devices within the ICS, capturing information that can be used, for example, to identify host devices, determine behaviors of host devices, or identify relationships between host devices. The device identification system 130 can apply the generated latent vectors to any of a variety of systems or models to derive information about the ICS using the latent vector representation of ICS communications.

In some implementations, the device identification system 130 uses one or more machine learning models to analyze the latent vector. A "model," as used herein, can refer to a construct that is trained using training data to make predictions or provide probabilities for new data items, whether or not the new data items were included in the training data. For example, training data for supervised learning can include items with various parameters and an assigned class. A new data item can have parameters that a model can use to assign a class to the new data item. Examples of models include: neural networks, support vector machines, decision trees, Parzen windows, Bayes, clustering, reinforcement learning, probability distributions, decision trees, decision tree forests, and others. Models can be configured for various situations, data types, sources, and output formats. Example applications of models to analyze devices in an ICS are described below with respect to FIGS. 6-10.

The computing systems on which the device identification system 130 is implemented can include a central processing unit, input devices, output devices (e.g., display devices and speakers), storage devices (e.g., memory and disk drives), network interfaces, graphics processing units, cellular radio link interfaces, global positioning system devices, and so on. The input devices may include keyboards, pointing devices, touch screens, gesture recognition devices (e.g., for air gestures), head and eye tracking devices, microphones for voice recognition, and so on. The computing systems may include desktop computers, laptops, tablets, e-readers, personal digital assistants, smartphones, gaming devices, servers, and so on. The computing systems may access computer-readable media that include computer-readable storage media (or mediums) and data transmission media. The computer-readable storage media are tangible storage means that do not include a transitory, propagating signal. Examples of computer-readable storage media include memory such as primary memory, cache memory, and secondary memory (e.g., DVD) and other storage. The computer-readable storage media may have recorded on it or may be encoded with computer-executable instructions or logic that implements the DID system. The data transmission media is used for transmitting data via transitory, propagating signals or carrier waves (e.g., electromagnetism) via a wired or wireless connection. The computing systems may include a secure cryptoprocessor as part of a central processing unit for generating and securely storing keys and for encrypting and decrypting data using the keys. The computing systems may be servers that are housed in a data center such as a cloud-based data center.

The device identification system 130 may be described in the general context of computer-executable instructions, such as program modules and components, executed by one or more computers, processors, or other devices. Generally, program modules or components include routines, programs, objects, data structures, and so on that perform particular tasks or implement particular data types. Typically, the functionality of the program modules may be combined or distributed as desired in various embodiments. Aspects of the DID system may be implemented in hardware using, for example, an application-specific integrated circuit (ASIC) or field programmable gate array ("FPGA").

Figure 2:
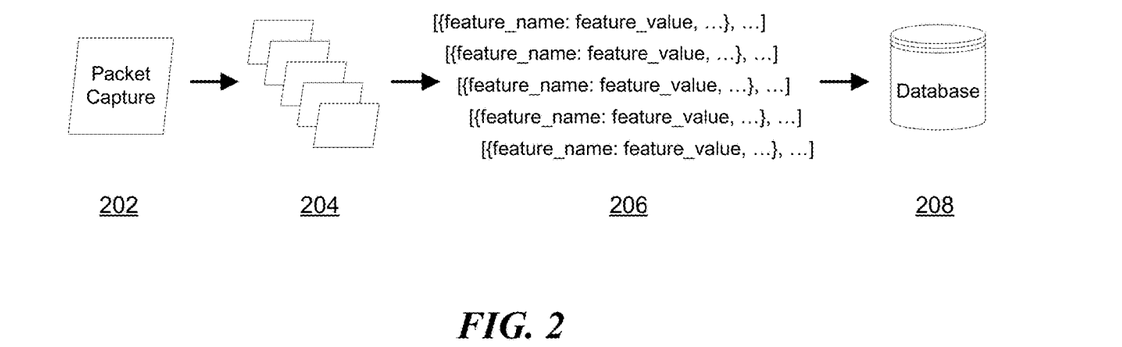
FIG. 2 illustrates an example data processing pipeline that can be used to extract features suitable for machine learning tasks from packets captured from an ICS.

FIG. 2 illustrates an example data processing pipeline that can be used to extract features suitable for machine learning tasks from packets captured from an ICS. At a packet capture stage 202, packets transmitted to or from host devices in the ICS are captured by an application programming interface (API) such as PCAP. The API can be coupled to a data source on the bus 115, such as a network tap configured to capture communication data as the host devices 110 transmit messages across the bus. The captured data is split into sub-files at a splitting phase 204, where deep packet inspection can be performed on each sub-file using a tool such as tshark. The dissected packets are assembled into a key/value hash structure at an assembly phase 206. Finally, at a storage phase 208, the hashes are inserted into a database for storage. The database can be configured as a relational database. In some implementations, packet fields appearing in greater than a specified number of packets (e.g., 10%) can be considered primary columns of a database schema while the remaining infrequently appearing packets are stored as a single JSON-valued column. A sample of the schema used to store the captured data follows:

```
CREATE TABLE IF NOT EXISTS "site300" (
    ...
    "dnp3.start" TEXT,
    "dnp3.len" TEXT,
    "dnp3.ctl" TEXT,
    "dnp3.ctl.dir" TEXT,
    "dnp3.ctl.prm" TEXT,
    "dnp3.ctl.fcb" TEXT,
    "dnp3.ctl.fcv" TEXT,
    "dnp3.ctl.prifunc" TEXT,
    "dnp3.dst" TEXT,
    "dnp3.addr" TEXT,
    "dnp3.src" TEXT,
    "dnp3.hdr.crc" TEXT,
    "dnp.hdr.crc.status" TEXT,
    "dnp3.tr.ctl" TEXT,
    "dnp3.tr.fin" TEXT,
    "dnp3.tr.fir" TEXT,
    "dnp3.tr.seq" TEXT,
    "dnp.data_chunk" TEXT,
    "dnp.data_chunk_len" TEXT,
    "dnp.data_chunk.crc" TEXT,
    "dnp.data_chunk.crc.status" TEXT,
    "dnp3.al.fragment" TEXT,
    "dnp3.al.fragment.count" TEXT,
    "dnp3.al.fragment.reassembled.length" TEXT,
    "dnp3.al.ctl" TEXT,
    "dnp3.al.fir" TEXT,
    "dnp3.al.fin" TEXT,
    "dnp3.al.con" TEXT,
    "dnp3.al.uns" TEXT,
    "dnp3.al.seq" TEXT,
    "dnp3.al.func" TEXT,
    "dnp3.al.obj" TEXT,
    "dnp3.al.objq.prefix" TEXT,
    "dnp3.al.objq.range" TEXT,
    "dnp3.ctl.dfc" TEXT,
    "dnp3.ctl.secfunc" TEXT,
    "dnp3.al.iin" TEXT,
    "dnp3.al.iin.rst" TEXT,
    "dnp3.al.iin.dt" TEXT,
    "dnp3.al.iin.dol" TEXT,
    "dnp3.al.iin.tsr" TEXT,
    "dnp3.al.iin.cls3d" TEXT,
    "dnp3.al.iin.cls2d" TEXT,
    "dnp3.al.iin.cls1d" TEXT,
    "dnp3.al.iin.bmsg" TEXT,
    "dnp3.al.iin.cc" TEXT,
    "dnp3.al.iin.cae" TEXT,
    "dnp3.al.iin.sbo" TEXT,
    "dnp3.al.iin.pioor" TEXT,
    "dnp3.al.iin.obju" TEXT,
    "dnp3.al.iin.fcni" TEXT
);
```

Figure 3:
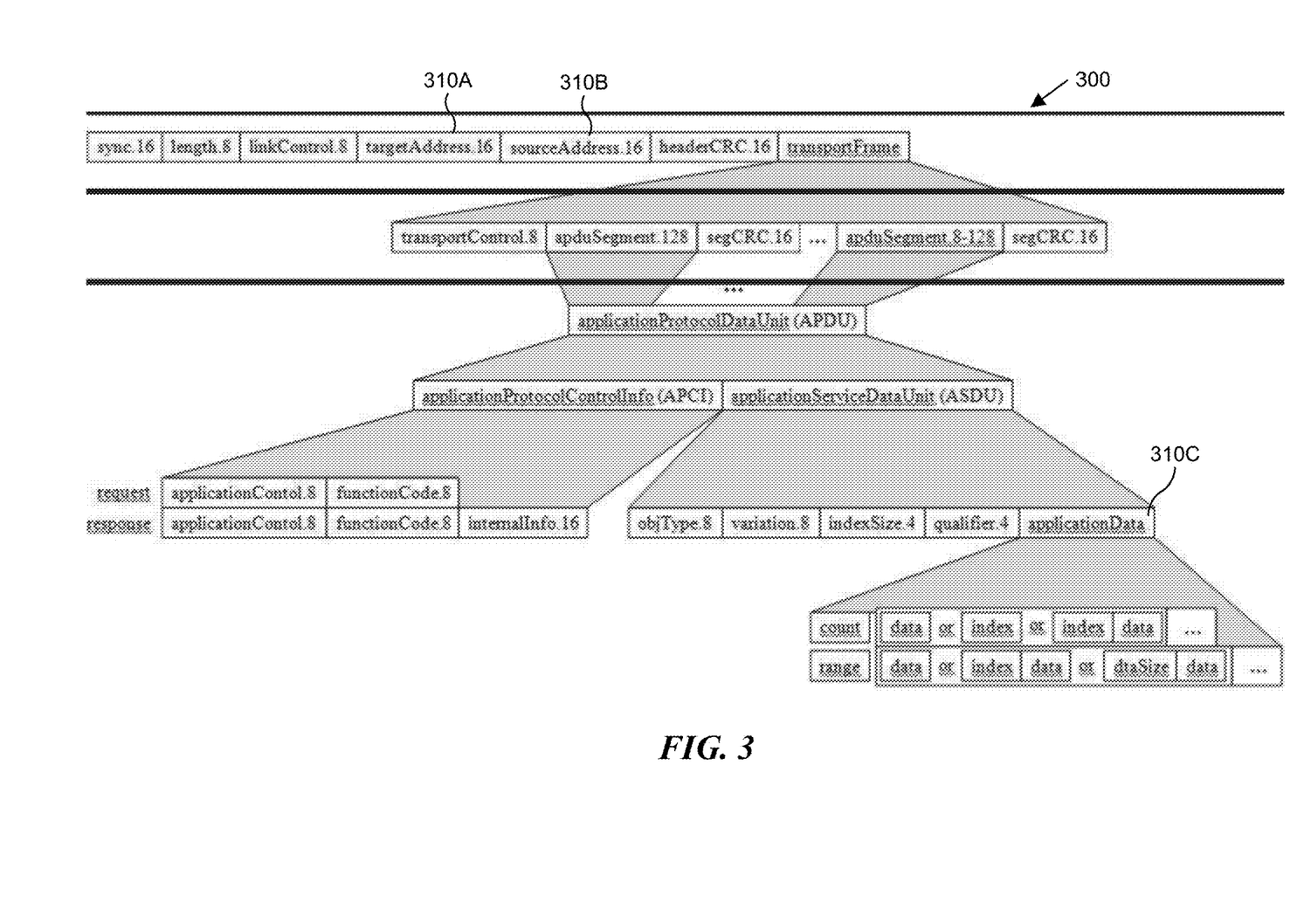
FIG. 3 illustrates an example packet structure of a distributed network protocol (DNP3).

As described above, at least some of the communications transmitted within the ICS use a dedicated ICS communication protocol. An example packet structure of a distributed network protocol (DNP3) is illustrated in FIG. 3. As shown, a packet 300 includes multiple fields 310 including, for example, a targetAddress field 310A, a sourceAddress field 3108, and applicationData fields or subfields 310C. The ICS devices 110 can additionally or alternatively communicate using protocols other than DNP3, including ICS protocols (such as Modbus) or non-ICS protocols (such as Internet protocol).

Figure 4:
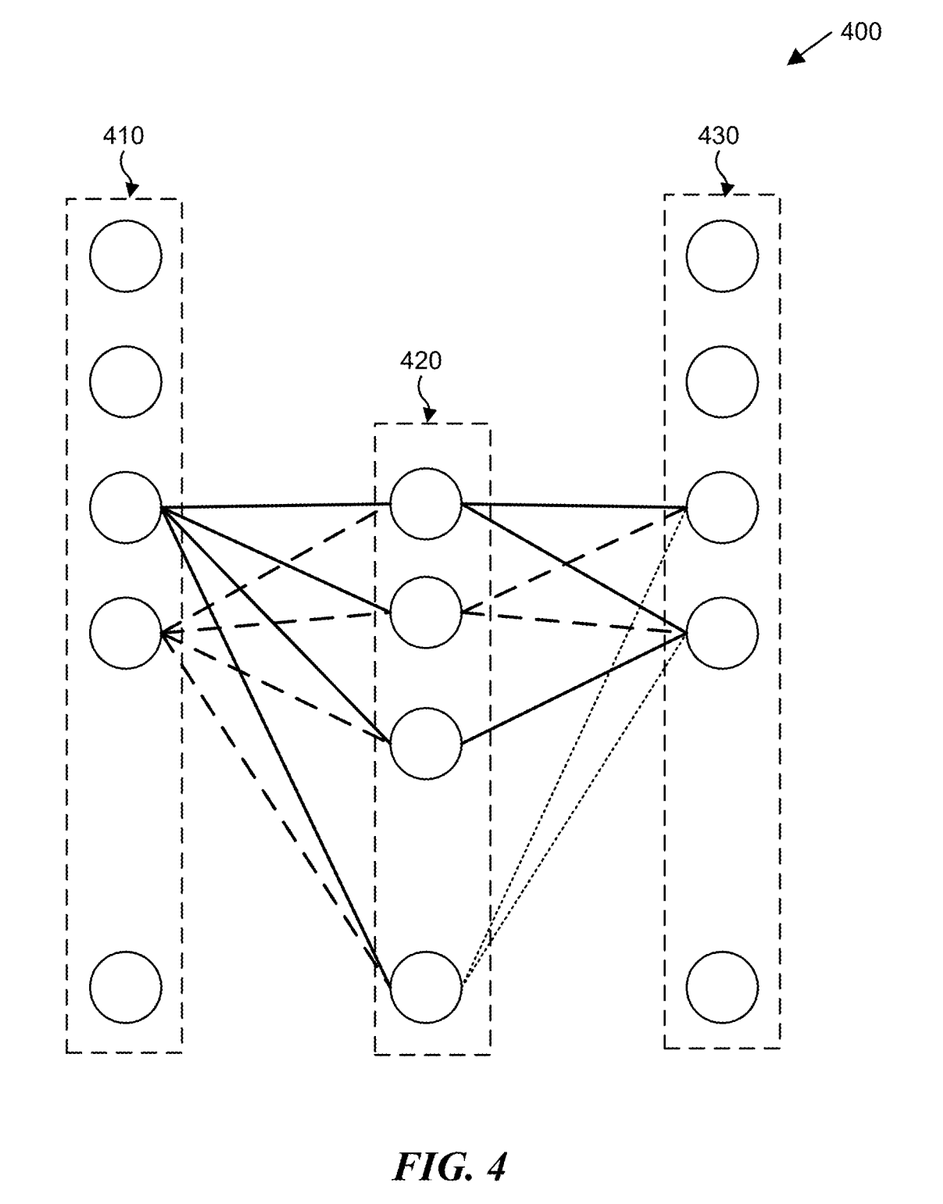
FIG. 4 illustrates an example neural network that can be used to generate latent vectors.

Packet data captured by the packet inspector 120 is input to a neural network that produces latent vector representations of host devices. FIG. 4 illustrates an example neural network 400 that can be used to generate latent vectors descriptive of an identity or behavior of a host device within an ICS.

A neural network model has three major components: architecture, cost function, and search algorithm. The architecture defines the functional form relating the inputs to the outputs (in terms of network topology, unit connectivity, and activation functions). During a training process, a computing system performs a search in weight space for a set of weights that minimizes the objective function.

The neural network 400 has a set of input nodes 410 that receive data associated with communications transmitted within the ICS 100, such as values of specified fields within communications transmitted in accordance with an ICS protocol. The input nodes can correspond to functions that receive the input and produce results. These results can be provided to a level of intermediate nodes (a "hidden layer") 420 that each produce further results based on a combination of input node results. A weighting factor is applied to the output of each input node before the result is passed to the hidden layer nodes. The hidden layer 420 can have lower dimensionality than the input and/or output layers, in some implementations. At a final layer ("the output layer"), a set of output nodes 430 are mapped to other data associated with communications transmitted within the ICS 100. In some implementations, the input nodes 410 receive values of a first set of fields extracted from communication data packets and the output nodes 430 receive values of a second set of fields extracted from the packets. Once the neural network is trained, application of the field values to the input and output nodes produces a latent vector at the hidden layer that represents the communication data. The particular fields of a data packet that are applied at each of the input nodes and output nodes can be specified by a designer of the neural network 400 to produce latent vectors that satisfy one or more constraints.

The neural network 400 can be trained by the device identification system 130 or by an external system that provides the trained models to the device identification system 130 for use in generating latent vectors based on ICS communication data. Different neural networks can be trained for different communication protocols. For example, a first neural network is trained to receive DNP3 field values at the input layer 410, while a second model is trained to receive Modbus field values at the input layer 410.

Figure 5:
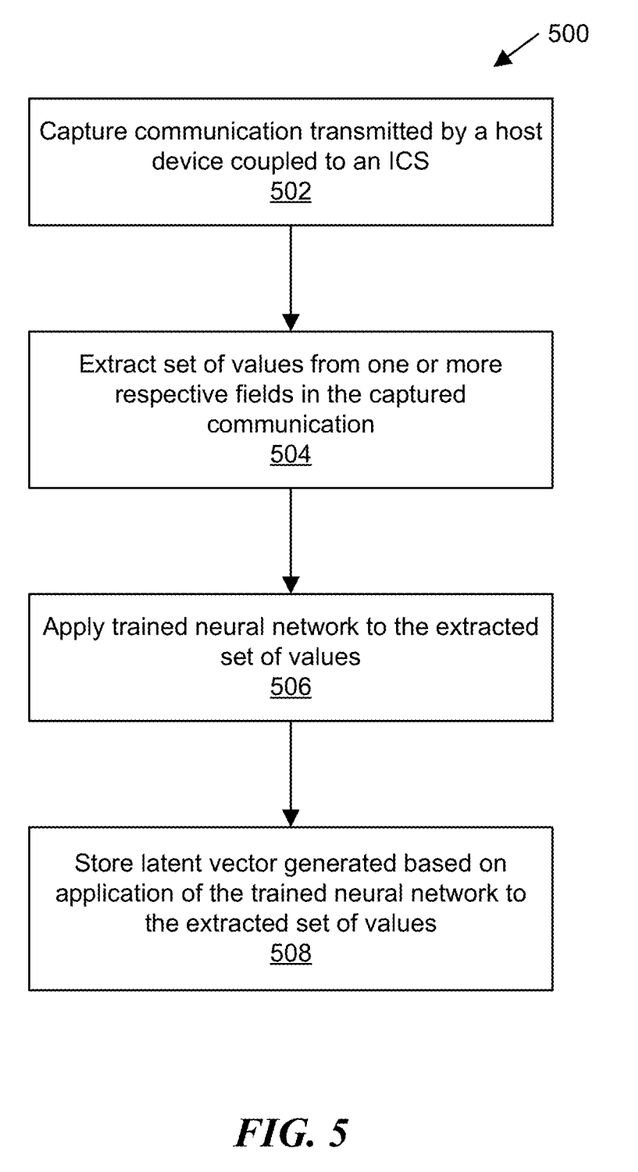
FIG. 5 is a flowchart illustrating a process for generating representations of host device behaviors in an ICS, according to some implementations.

FIG. 5 is a flowchart illustrating a process 500 for generating representations of host device behaviors in an ICS, according to some implementations. The process 500 can be performed by one or more computing systems, such as the device identification system 130. Other implementations of the process 500 can include additional, fewer, or different steps, or can perform the steps in different orders.

At block 502, the computing systems capture a communication transmitted by a host device coupled to an ICS. The communication is transmitted in accordance with an ICS communication protocol, such as DNP3 or Modbus, that specifies a packet structure containing a plurality of fields. In some implementations, the communication is captured by a passive network tap coupled to the ICS.

At block 504, the computing systems extract a set of values from one or more respective fields in the captured communication.

At block 506, a trained neural network is applied to the extracted set of values. Values of a first set of fields can be applied at an input layer of the neural network, while values of a second set of fields can be applied at an output layer. For example, the first set of fields can include fields related to a source of the communication and the second set of fields can include fields related to a destination for the communication.

At block 508, the computing systems store a latent vector that is generated by the neural network when applied to the extracted set of values.

ICS Device Characterization using Latent Vectors

Figure 6:
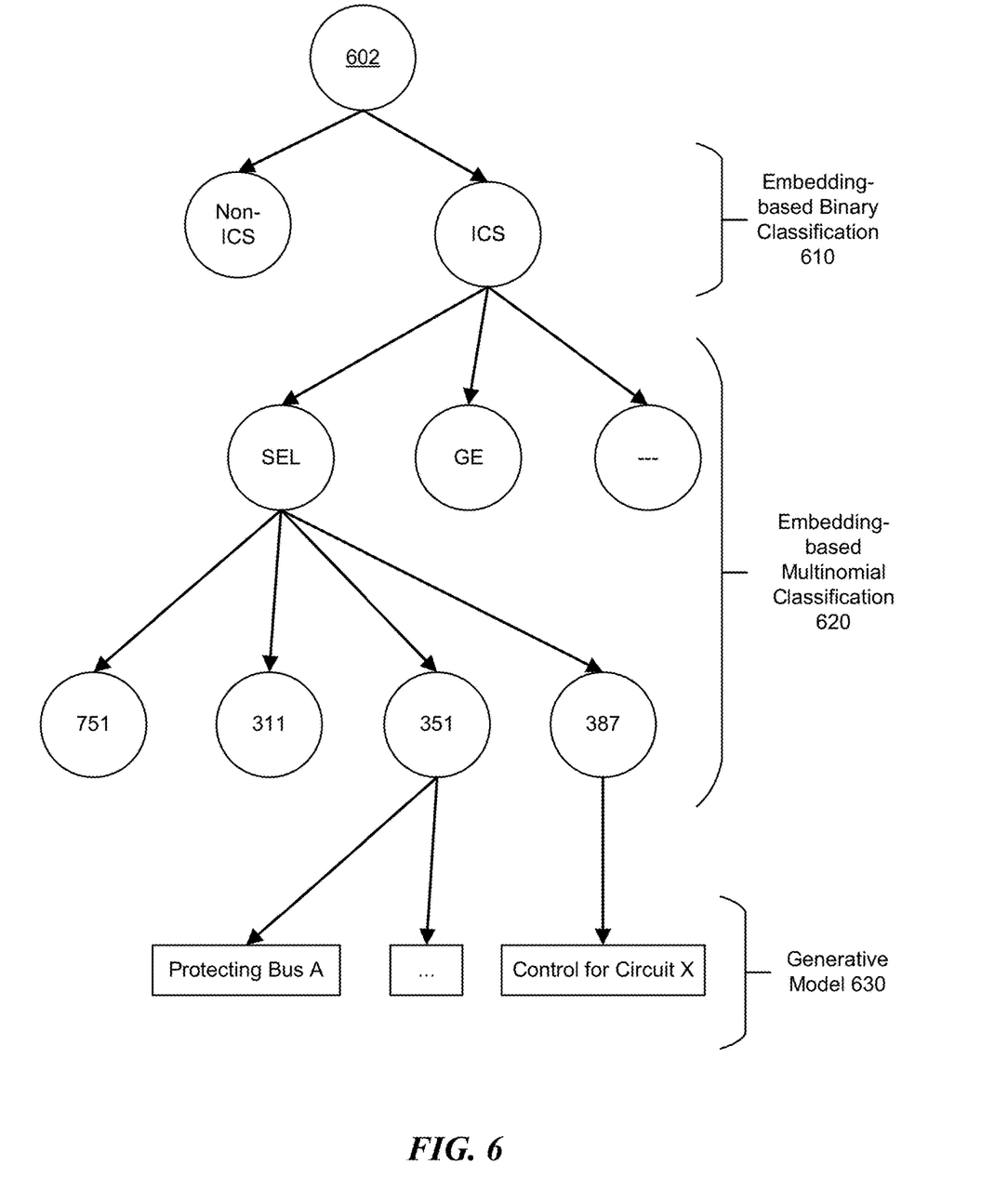
FIG. 6 illustrates an example data processing flow in which latent vectors that are generated based on ICS communications can be used to derive information about host ICS devices.

The latent vectors produced by the neural network 400 can be used as an input to any of a variety of other types of models or data processing pipelines to derive information about devices coupled to an ICS or the ICS itself. FIG. 6 illustrates an example data processing flow in which latent vectors that are generated based on ICS communications can be used to derive information about host ICS devices. As shown in FIG. 1, a representation 602 of a device communicating on an ICS network (e.g., a latent vector) can be processed by an embedding-based binary classification model 610 to classify the data input as belonging to an ICS device or a non-ICS device. If the device is classified as an ICS device, one or more embedding-based multinomial classification models 620 can be used to classify the manufacturer of the device and the particular model of the device. Finally, a generative model 630 can be used to identify the particular role of a device within the ICS, such as protecting a particular bus within the system, providing control for a particular circuit within the system, sensing a voltage, etc.

Figure 7:
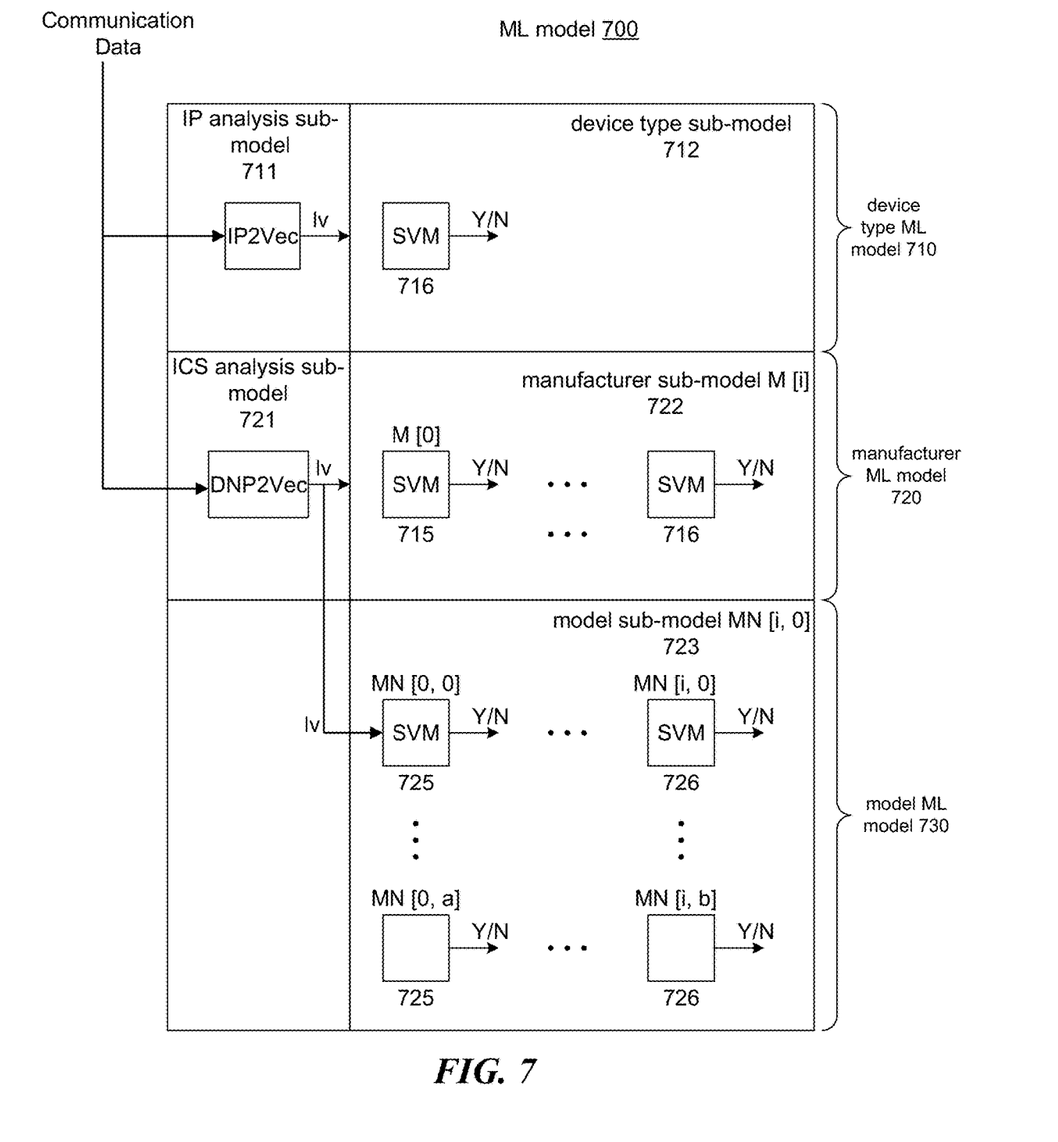
FIG. 7 illustrates another example data processing flow in which a machine learning model processes communication data to derive information about devices in an ICS.

FIG. 7 illustrates another example data processing flow in which a machine learning model 700 processes communication data to derive information about devices in an ICS. The ML model 700, which can be trained and/or used by the device identification system 130 in some implementations, includes a device type ML model 710, a manufacturer ML model 720, and a model ML model 730. The device type ML model includes an Internet protocol (IP) analysis sub-model 711 and a device type sub-model 712. The IP analysis sub-model includes a neural network that inputs an IP address and outputs a latent vector. The device type sub-model includes a support vector machine 716 that inputs the latent vector and outputs an indication of whether the IP address corresponds to an ICS device. The manufacturer ML model includes an ICS analysis sub-model 721 and a manufacturer sub-model 722. The ICS analysis sub-model 721 can include the neural network 400 described above, which inputs the communication data and outputs a latent vector. The manufacturer sub-model 722 includes a support vector machine 715, 716 for each manufacturer i that inputs a latent vector and outputs an indication of whether the communication data corresponds to an ICS device of manufacturer i. The model ML model may share the ICS analysis sub-model. The model sub-model 723 may include a support vector machine 725, 726 for each combination of a manufacturer and device type. The support vector machines M[0,a] correspond to manufacturer zero and models zero through a. The model sub-model 723 inputs a latent vector and a manufacturer and inputs the latent vector to each SVM of that manufacturer.

The device type ML model 710 identifies whether a device is an ICS device based on, for example, an IP address (source or destination) used in its communications. The device type ML model is a multi-tiered model that includes an IP analysis sub-model to identify a latent vector representing an IP address and a device type sub-model to identify device type for an IP address given the latent vector representing the IP address.

The training data for the IP analysis sub-model may include feature vectors with an IP address as an element with each feature vector labels with another IP field such as source IP port or destination IP port. The training data may include different combinations of an IP address and another field. For example, the training data may include a feature vector with a source IP address that is labeled with a source IP port and another feature vector with that source IP address labeled with a destination IP port for each communication with that source IP address.

The training data for the device type sub-model may include feature vectors with a latent vector as an element with each feature vector labeled with a device type. To generate the training data, the device identification system 130 submits IP addresses to the IP analysis sub-model to generate a latent vector for each IP address. The device identification system 130 then generates feature vectors that each includes a latent vector for an IP address and labels each feature vector with the device type of the IP address. The device type sub-model may be a Support Vector Machine (SVM).

After the device type sub-model of the device type layer is trained, the device identification system 130 identifies the device type associated with an IP address by inputting the IP address to IP analysis sub-model to generate a latent vector. The device identification system 130 then inputs the latent vector to the device type sub-model to identify the device type.

The manufacturer ML model 720 identifies the manufacturer of an ICS device based on an IP address used in its communications. The manufacturer ML model is a multi-tiered model that includes an ICS analysis sub-model to identify a latent vector representing an IP address and a manufacturer sub-model to identify the manufacturer of the device associated with an IP address given the latent vector representing the IP address.

The training data for the ICS analysis sub-model of the manufacturer ML model 720 is similar to the IP analysis sub-model of the device type ML model 710. However, the ICS analysis sub-model of the manufacturer ML model is trained with labels that are derived from field defined by an ICS communication protocol. For example, a feature vector with an IP address may be labeled with the value of a cyclic redundancy check (CRC) field of DNP3 and a separate feature vector with that IP address labeled with the value of an obj field of DNP3.

The training data for the manufacturer sub-model may include feature vectors that contain a latent vector and that are labeled with the manufacturer associated with the IP address that the latent vector represents. The manufacturer sub-model may be a neural network that outputs a probability for each manufacturer. The manufacturer sub-model may alternatively have an SVM for each manufacturer. Each SVM is trained using feature vectors with a latent variable that are each labeled as a positive or negative example based on whether the latent variable is for an IP address is associated with the manufacturer associated with that SVM.

After the manufacturer ML model of the manufacturer layer is trained, the device identification system 130 may identify the manufacturer associated with an IP address by inputting the IP address to the ICS analysis sub-model of the manufacturer ML model to generate a latent vector. The device identification system 130 then inputs the latent vector to the manufacturer sub-model to identify the manufacturer.

A model ML model of the model layer identifies the model of an ICS device given its manufacturer based on the latent vector generated by the manufacturer layer. The model ML model includes a ICS analysis sub-model that may be similar to or the same as the ICS analysis sub-model of the manufacturer ML model. The model ML model includes a model sub-model 730 that inputs latent vector for an IP address associated with a device and the manufacturer of the device and outputs the model of that device.

The training data for the model sub-model 730 can be a collection of feature vectors that each includes an IP address of a device and the manufacturer of the device labeled with the model of the device. The model sub-model may include a neural network for each manufacturer that is trained using feature vectors for that manufacturer. The model sub-model may alternatively have an SVM for each manufacturer and each model of the manufacturer. The training data for an SVM of a manufacturer for a model may be the latent vectors for that manufacturer labeled to indicate whether the latent vector is a positive or negative example of that model.

After the model ML model of the model layer is trained, the device identification system 130 identifies the model by first using the manufacturer ML model to identify the manufacturer. The device identification system 130 then inputs to the latent vector of manufacture layer to the model sub-model for the identified manufacturer to identify the model number.

In some implementations, the device identification system 130 employs the Scikit learn system to generate the manufacturer sub model and the model sub model. The SVM modules of Scikit learn utilizes a one vs one scheme (in the SVC class) to perform multi class classification; internally the SVC class actually constructs (N*(N−1))/2 classifiers, where N=the number of classes. (See, https://scikit learn.org/stable/modules/svm.html#svm classification).

In some embodiments, the device identification system 130 may employ various ML techniques or combination of ML techniques including neural networks (e.g., autoencoder, convolutional), a support vector machine, a Bayesian classifier, and so on. When the classifier is a deep neural network, the training results in a set of weights for the activation functions of the deep neural network. A support vector machine operates by finding a hyper-surface in the space of possible inputs. The hyper-surface attempts to split the positive examples (e.g., feature vectors for photographs) from the negative examples (e.g., feature vectors for graphics) by maximizing the distance between the nearest of the positive and negative examples to the hyper-surface. This step allows for correct classification of data that is similar to but not identical to the training data. Various techniques can be used to train a support vector machine.

Adaptive boosting is an iterative process that runs multiple tests on a collection of training data. Adaptive boosting transforms a weak learning algorithm (an algorithm that performs at a level only slightly better than chance) into a strong learning algorithm (an algorithm that displays a low error rate). The weak learning algorithm is run on different subsets of the training data. The algorithm concentrates more and more on those examples in which its predecessors tended to show mistakes. The algorithm corrects the errors made by earlier weak learners. The algorithm is adaptive because it adjusts to the error rates of its predecessors. Adaptive boosting combines rough and moderately inaccurate rules of thumb to create a high-performance algorithm. Adaptive boosting combines the results of each separately run test into a single, very accurate classifier. Adaptive boosting may use weak classifiers that are single-split trees with only two leaf nodes.

In some embodiments, the device identification system 130 may use various design-of-experiments ("DOE") techniques to identify values of feature vectors of consumer entities that result in positive outcomes for various action inducers. Suitable DOE techniques include central composite techniques, Box-Behnken techniques, random techniques, Plackett-Burman techniques, Taguchi techniques, Halton, Faure, and Sobel sequences techniques, Latin hypercube techniques, and so on. (See Cavazzuti, M., "Optimization Methods: From Theory to Design," Springer-Verlag Berlin Heidelberg, 2013, chap. 2, pp. 13-56, which is hereby incorporated by reference.) The Latin hypercube technique has the characteristic that it generates sample values in which each axis (i.e., feature) has at most value that is selected.

In some embodiments, the device identification system 130 may use a generative adversarial network (GAN) that is based on a GAN to train a sub-model. (See, Ian Goodfellow, Jean Pouget-Abadie, Mehdi Mirza, Bing Xu, David Warde-Farley, Sherjil Ozair, Aaron Courville, and Yoshua Bengio, "Generative Adversarial Nets," Advances in Neural Information Processing Systems, pp. 2672-2680, 2014, which are hereby incorporated by reference.)

Figure 8:
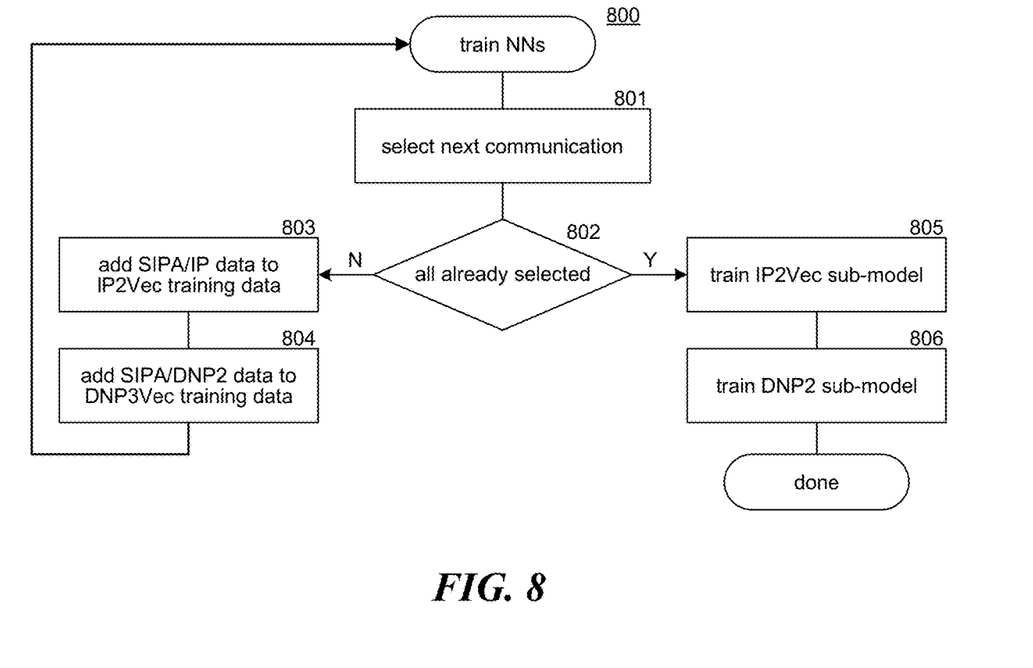
FIG. 8 is a flowchart that illustrates a process for training multiple model components using communication data, according to some implementations.

FIG. 8 is a flowchart that illustrates a process 800 for training multiple model components, such as the neural network 400, the IP analysis sub-model 711, or the ICS analysis sub-model 721, using a common set of communication data. In block 801, the component selects a next communication. In decision block 802, if all the communications have already been selected, the component continues at block 805, else the component continues at block 803. In block 803, the component adds a field value from the selected communication (e.g., source IP address) labeled with a classification (e.g., IP data) to the training data for a first model (e.g., the IP analysis sub-model 711). In block 804, the component adds a field value from the communication (e.g., source IP address) labeled with another classification (e.g., DNP3 data) to the training data set for a second model (e.g., the ICS analysis sub-model 721). The component then loops to 801 to select the next source IP address. In block 805, the component trains the first model. In block 806, the component trains the second model. The component then completes.

Figure 9:
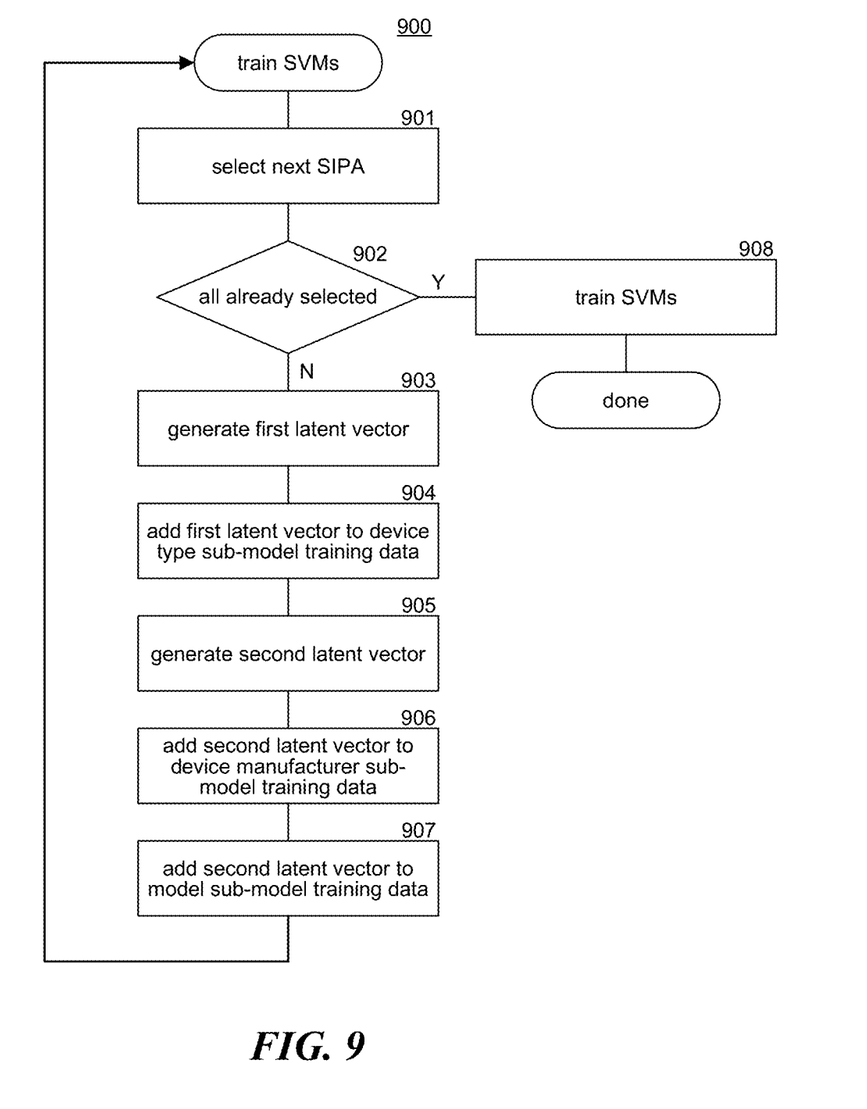
FIG. 9 is a flowchart that illustrates a process for training support vector machines to classify devices on an ICS, according to some implementations.

FIG. 9 is a flowchart that illustrates a process 900 for training support vector machines to classify devices on an ICS, according to some implementations. When the process 900 is performed by a component, the component trains the support vector machines for sub-models that use latent vectors to determine information about the devices coupled to an ICS, such as the manufacturer sub-model 722 or the model sub-model 723. In block 901, the component selects a next source IP address. In decision block 902, if all the source IP addresses have already been selected, then the component continues at block 908, else the component continues at block 903. In block 903, the component inputs the source IP address to a first trained model (such as the IP analysis sub-model 711) to generate a first latent vector representing the source IP address. In block 904, the component adds the latent vector and device type of the device that the source IP address represents to training data for the device type sub-model. In block 904, the component inputs the source IP address to a second trained model (such as the ICS analysis sub-model 721) to generate a second latent vector representing the source IP address. In block 906, the component adds the latent vector and manufacturer of the device that the source IP address represents to a training data for a device manufacturer sub-model. In block 907, the component adds a latent vector label to indicate the manufacturer and model number, then adds the second latent vector and the label to the training data for the manufacturer and model number sub-model. The component then loops to block 901 to select the next source IP address. In block 908, the component trains the support vector machines of the device type sub-model, the manufacturer sub-model, and the model sub-model.

Figure 10:
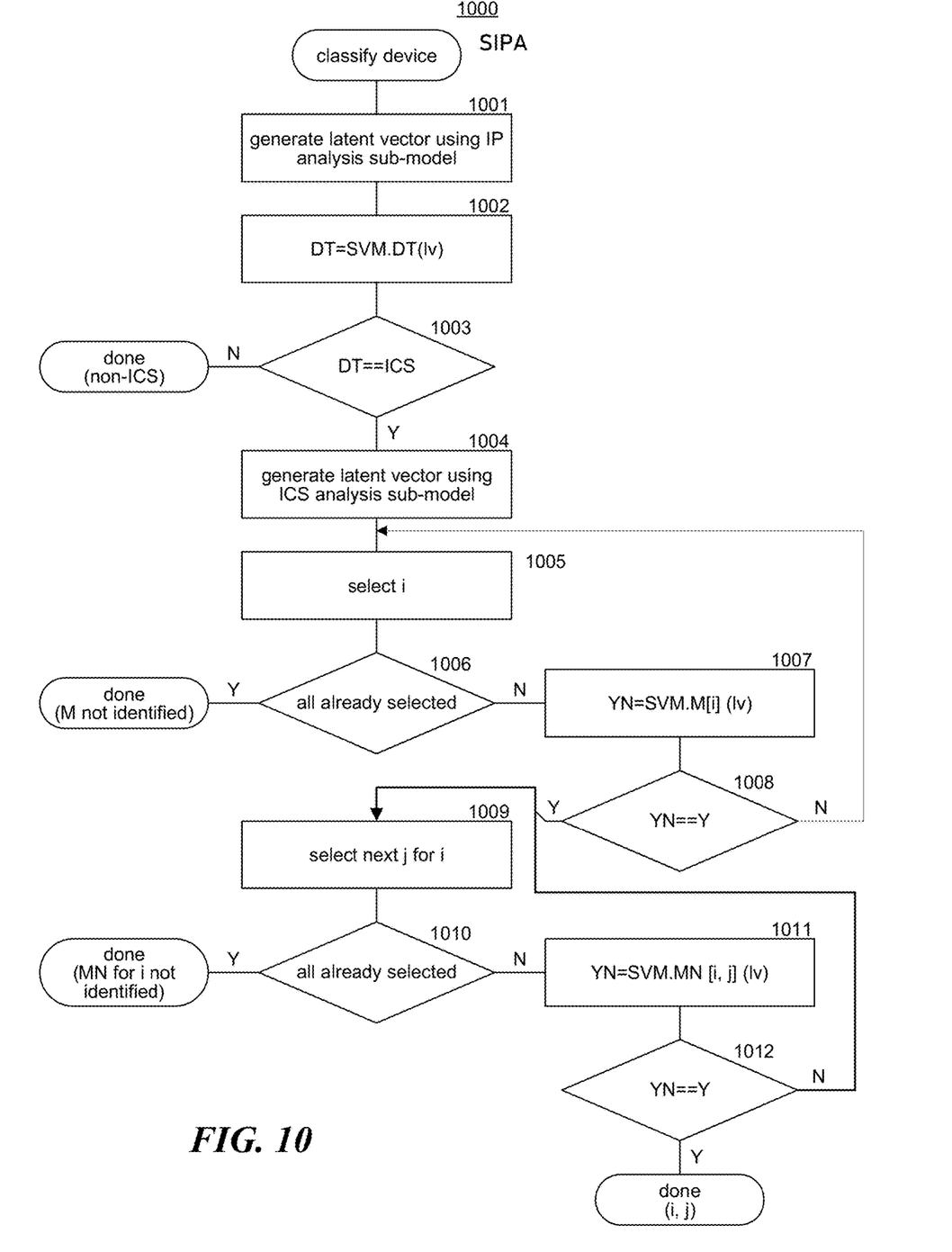
FIG. 10 is a flowchart that illustrates a process for classifying devices on an ICS, according to some implementations.

FIG. 10 is a flowchart that illustrates a process 1000 for classifying devices on an ICS, according to some implementations. In the process 1000, a component is passed an indication of a source IP address and returns an indication of whether it represents an ICS device. If the component determines the source address represents an ICS device, the component further returns the device's manufacturer and model number. As shown in FIG. 10, the component inputs, in block 1001, the source IP address into the IP analysis sub-model to generate a latent vector. In block 1002, the component inputs of the latent vector to the support vector machine for the device type model to determine the device type. In decision block 1003, when the device type is an ICS device, the component continues at block 1004; else the component completes indicating that the device is not an ICS device. In block 1004, the component inputs the source IP address to the ICS analysis sub-model to generate a latent vector. In blocks 1005-1012, the component loops identifying a manufacturer and model number for that manufacturer. In block 1005, the component selects the next manufacturer i. In decision block 1006, if all the manufacturers have already been selected, then the component completes indicating that the manufacturer has not been identified, else the component continues to block 1007. In block 1007, the component inputs the latent vector to the support vector machine for the selected manufacturer to identify whether the latent vector represents a device of that manufacturer. In decision block 1008, if the IP address represents a device of the selected manufacturer, then the component continues at block 1009, else the component loops to block 1005 to select the next manufacturer. In block 1009, the component selects the next model j for the selected manufacturer i. In block 1010, if all of the models for the selected manufacturer have already been selected, then the component returns an indication that the model for the identified manufacturer could not be identified, else the component continues at block 1011. In block 1011, the component inputs the latent vector to the support vector machine for the model for identified manufacturer and selected model. In decision block 1012, if the source IP address represents a device of the identified manufacturer and the selected model, then the component completes indicating the manufacturer and model, else the component loops to block 1009 to select the next model for the identified manufacturer.

The latent vectors described herein can be used in any of a variety of models other than those described with respect to FIGS. 6-10 to derive information about devices coupled to an ICS or the interaction between devices within an ICS. Such models can be customized by an administrator associated with an ICS in order to determine any desired information based on communication data captured passively from the ICS.

Computer System

Figure 11:
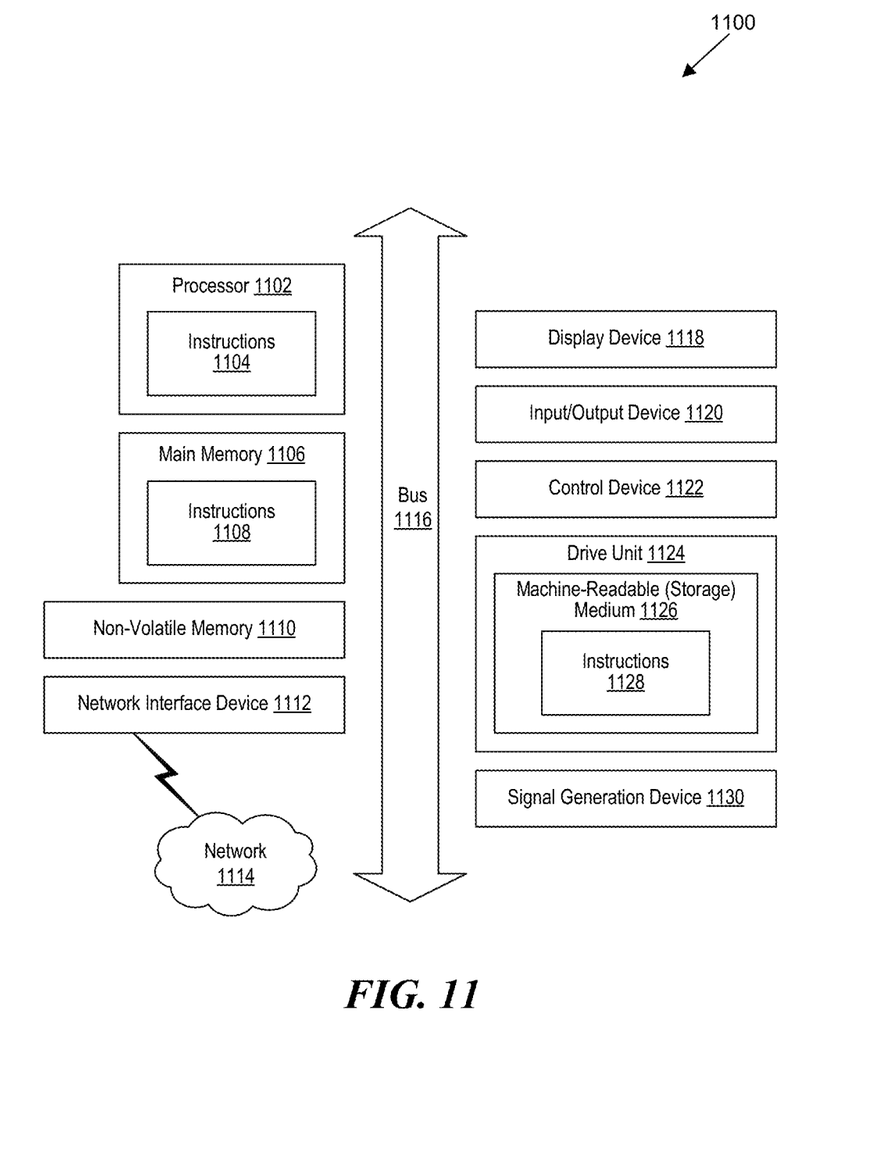
FIG. 11 is a block diagram that illustrates an example of a computer system in which at least some operations described herein can be implemented.

FIG. 11 is a block diagram that illustrates an example of a computer system 1100 in which at least some operations described herein can be implemented. As shown, the computer system 1100 can include: one or more processors 1102, main memory 1106, non-volatile memory 1110, a network interface device 1112, video display device 1118, an input/output device 1120, a control device 1122 (e.g., keyboard and pointing device), a drive unit 1124 that includes a storage medium 1126, and a signal generation device 1130 that are communicatively connected to a bus 1116. The bus 1116 represents one or more physical buses and/or point-to-point connections that are connected by appropriate bridges, adapters, or controllers. Various common components (e.g., cache memory) are omitted from FIG. 11 for brevity. Instead, the computer system 1100 is intended to illustrate a hardware device on which components illustrated or described relative to the examples of the figures and any other components described in this specification can be implemented.

The computer system 1100 can take any suitable physical form. For example, the computing system 1100 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 1100. In some implementation, the computer system 1100 can be an embedded computer system, a system-on-chip (SOC), a single-board computer system (SBC) or a distributed system such as a mesh of computer systems or include one or more cloud components in one or more networks. Where appropriate, one or more computer systems 1100 can perform operations in real-time, near real-time, or in batch mode.

The network interface device 1112 enables the computing system 1100 to mediate data in a network 1114 with an entity that is external to the computing system 1100 through any communication protocol supported by the computing system 1100 and the external entity. Examples of the network interface device 1112 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 1106, non-volatile memory 1110, machine-readable medium 1126) can be local, remote, or distributed. Although shown as a single medium, the machine-readable medium 1126 can include multiple media (e.g., a centralized/distributed database and/or associated caches and servers) that store one or more sets of instructions 1128. The machine-readable (storage) medium 1126 can include any medium that is capable of storing, encoding, or carrying a set of instructions for execution by the computing system 1100. The machine-readable medium 1126 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 1110, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 1104, 1108, 1128) set at various times in various memory and storage devices in computing device(s). When read and executed by the processor 1102, the instruction(s) cause the computing system 1100 to perform operations to execute elements involving the various aspects of the disclosure.

Remarks

The terms "example", "embodiment" and "implementation" are used interchangeably. For example, reference to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

We claim:

1. A method performed by one or more computing systems, the method comprising:
   capturing, by the one or more computing systems, a communication transmitted by a host device coupled to an industrial control system (ICS), the communication transmitted according to an ICS communication protocol that specifies a packet structure including a plurality of fields;
   extracting, by the one or more computing systems, a set of values from one or more corresponding fields in the captured communication; and
   generating, by the one or more computer systems, a latent vector at a hidden layer in a neural network by applying values of a first set of fields within the communication to an input layer of the neural network and applying values of a second set of fields within the communication to an output layer of the neural network.

2. The method of claim 1, further comprising:
   accessing a machine learning model trained to identify whether a respective device is an ICS device, the machine learning model trained based on a set of communications transmitted by respective host devices coupled to the ICS according to an Internet protocol; and applying the machine learning model to a selected communication transmitted by a target device to identify whether the target device is an ICS device.

3. The method of claim 1, further comprising:

determining a manufacturer or a model of a target device by applying the latent vector to a device information machine learning model that is trained to output an identity of the manufacturer or the model based on an input that includes the latent vector.

4. The method of claim 1, wherein capturing the communication comprises receiving data associated with the communication that was passively captured by an out-of-band network tap.

5. The method of claim 1, further comprising:

training a first neural network based on a first ICS communication protocol; and training a second neural network based on a second ICS communication protocol that is different from the first ICS communication protocol;

wherein generating the latent vector comprises applying fields extracted from one or more communications transmitted according to the first ICS communication protocol to the first neural network and applying fields extracted from one or more communications transmitted according to the second ICS communication protocol to the second neural network.

6. The method of claim 1, wherein the ICS communication protocol is a distributed network protocol.

7. The method of claim 1, wherein the ICS communication protocol is a Modbus protocol.

8. The method of claim 1, wherein the first set of fields applied to the input layer of the neural network comprise fields related to a source of the communication, and wherein the second set of fields applied at the output layer of the neural network comprise fields related to a destination for the communication.

9. The method of claim 1, wherein the neural network has only a single hidden layer.

10. A system comprising:

a packet inspector configured to capture a communication transmitted by a host device coupled to an industrial control system (ICS), the communication transmitted according to an ICS communication protocol that specifies a packet structure including a plurality of fields; and a device identification system comprising a processor and a non-transitory computer-readable storage medium storing instructions, execution of which by the processor causing the processor to perform operations including:

extracting a set of values from one or more corresponding fields in the captured communication; and generating a latent vector at a hidden layer in a neural network by applying values of a first set of fields within the communication to an input layer of the neural network and applying values of a second set of fields within the communication to an output layer of the neural network.

11. The system of claim 10, wherein the packet inspector comprises an out-of-band network tap configured to passively capture data associated with the communications.

12. The system of claim 10, wherein execution of the instructions further causes the processor to perform operations comprising:

accessing a machine learning model trained to identify whether a respective device is an ICS device, the machine learning model trained based on a set of communications transmitted by respective host devices coupled to the ICS according to an Internet protocol; and applying the machine learning model to a selected communication transmitted by a target device to identify whether the target device is an ICS device.

13. The system of claim 10, wherein execution of the instructions further causes the processor to perform operations comprising:

determining a manufacturer or a model of a target device by applying the latent vector to a device information machine learning model that is trained to output an identity of the manufacturer or the model based on an input that includes the latent vector.

14. The system of claim 10, wherein execution of the instructions further causes the processor to perform operations comprising:

training a first neural network based on a first ICS communication protocol; and training a second neural network based on a second ICS communication protocol that is different from the first ICS communication protocol;

wherein generating the latent vector comprises applying fields extracted from one or more communications transmitted according to the first ICS communication protocol to the first neural network and applying fields extracted from one or more communications transmitted according to the second ICS communication protocol to the second neural network.

15. The system of claim 10, wherein the first set of fields applied to the input layer of the neural network comprise fields related to a source of the communication, and wherein the second set of fields applied at the output layer of the neural network comprise fields related to a destination for the communication.

16. A non-transitory computer-readable storage medium having stored thereon instructions, execution of which by one or more processors causes the one or more processors to perform operations comprising:

capturing a communication transmitted by a host device coupled to an industrial control system (ICS), the communication transmitted according to an ICS communication protocol that specifies a packet structure including a plurality of fields;

extracting a set of values from one or more respective fields in the captured communication; and generating a latent vector at a hidden layer in a neural network by applying values of a first set of fields within the communication to an input layer of the neural network and applying values of a second set of fields within the communication to an output layer of the neural network.

17. The non-transitory computer-readable storage medium of claim 16, wherein capturing the communication comprises receiving data associated with the communication that was passively captured by an out-of-band network tap.

18. The non-transitory computer-readable storage medium of claim 16, wherein execution of the instructions further causes the one or more processors to perform operations comprising:

accessing a machine learning model trained to identify whether a respective device is an ICS device, the machine learning model trained based on a set of communications transmitted by respective host devices coupled to the ICS according to an Internet protocol; and applying the machine learning model to a selected communication transmitted by a target device to identify whether the target device is an ICS device.

19. The non-transitory computer-readable storage medium of claim 16, wherein execution of the instructions further causes the processor to perform operations comprising:

training a first neural network based on a first ICS communication protocol; and training a second neural network based on a second ICS communication protocol that is different from the first ICS communication protocol;

wherein generating the latent vector comprises applying fields extracted from one or more communications transmitted according to the first ICS communication protocol to the first neural network and applying fields extracted from one or more communications transmitted according to the second ICS communication protocol to the second neural network.

20. The non-transitory computer-readable storage medium of claim 16, wherein the first set of fields applied to the input layer of the neural network comprise fields related to a source of the communication, and wherein the second set of fields applied at the output layer of the neural network comprise fields related to a destination for the communication.

* * * * *